United States Patent
Catherman et al.

(10) Patent No.: US 7,673,134 B2
(45) Date of Patent: Mar. 2, 2010

(54) BACKUP RESTORE IN A CORPORATE INFRASTRUCTURE

(75) Inventors: Ryan Charles Catherman, Raleigh, NC (US); David Carroll Challener, Raleigh, NC (US); Scott Thomas Elliott, Raleigh, NC (US); James Patrick Hoff, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1321 days.

(21) Appl. No.: 11/101,290

(22) Filed: Apr. 7, 2005

(65) Prior Publication Data

US 2006/0230264 A1  Oct. 12, 2006

(51) Int. Cl.
*H04L 29/06* (2006.01)
*G06F 9/00* (2006.01)

(52) U.S. Cl. .................. 713/155; 713/156; 726/10; 726/12

(58) Field of Classification Search ............. 713/155, 713/193, 156; 726/10, 12
See application file for complete search history.

(56) References Cited

U.S. PATENT DOCUMENTS

| | | | |
|---|---|---|---|
| 5,944,794 A | 8/1999 | Okamoto et al. | |
| 6,052,785 A | 4/2000 | Lin et al. | |
| 6,185,681 B1 | 2/2001 | Zizzi | |
| 6,314,425 B1 | 11/2001 | Serbinis et al. | |
| 6,338,064 B1 | 1/2002 | Ault et al. | |
| 6,374,109 B1 | 4/2002 | Shaheen et al. | |
| 6,553,060 B2 | 4/2003 | Souissi et al. | |
| 6,768,721 B1 | 7/2004 | Schmitz et al. | |
| 7,240,219 B2 * | 7/2007 | Teicher et al. ............. | 713/193 |
| 2002/0003792 A1 | 1/2002 | Schmidl et al. | |
| 2002/0016912 A1 * | 2/2002 | Johnson ..................... | 713/165 |
| 2002/0021685 A1 | 2/2002 | Sakusabe | |
| 2002/0181417 A1 | 12/2002 | Molhotra et al. | |
| 2003/0028592 A1 * | 2/2003 | Ooho et al. ................. | 709/203 |
| 2003/0051026 A1 | 3/2003 | Carter et al. | |
| 2003/0054827 A1 | 3/2003 | Schmidl et al. | |
| 2003/0074567 A1 | 4/2003 | Charbonneau | |
| 2003/0078037 A1 | 4/2003 | Auckland et al. | |

(Continued)

OTHER PUBLICATIONS

Sirkin, M.J., Logon/Logoff Scheme for Dos Database Requester Which Works in Both Real and Protect Mode, TBD, Jun. 1991, p. 362-365.

*Primary Examiner*—Nasser G Moazzami
*Assistant Examiner*—Mohammad W Reza
(74) *Attorney, Agent, or Firm*—Antony P. Ng; Dillon & Yudell LLP

(57) ABSTRACT

A method and system for remotely storing a user's admin key to gain access to an intranet is presented. The user's admin key and intranet user identification (ID) are encrypted using an enterprise's public key, and together they are concatenated into a single backup admin file, which is stored in the user's client computer. If the user needs his admin file and is unable to access it in a backup client computer, he sends the encrypted backup admin file to a backup server and his unencrypted intranet user ID to an intranet authentication server. The backup server decrypts the user's single backup admin file to obtain the user's admin key and intranet user ID. If the unencrypted intranet user ID in the authentication server matches the decrypted intranet user ID in the backup server, then the backup server sends the backup client computer the decrypted admin key.

9 Claims, 6 Drawing Sheets

U.S. PATENT DOCUMENTS

| | | |
|---|---|---|
| 2003/0084280 A1 | 5/2003 | Bryan et al. |
| 2003/0208686 A1 | 11/2003 | Thummalapally et al. |
| 2003/0217281 A1 | 11/2003 | Ryan |
| 2003/0229786 A1 | 12/2003 | Hollis et al. |
| 2004/0059912 A1 | 3/2004 | Zizzi |
| 2004/0102192 A1 | 5/2004 | Serceki |
| 2004/0137905 A1 | 7/2004 | Jeong et al. |
| 2004/0156382 A1 | 8/2004 | Jang |
| 2004/0187012 A1* | 9/2004 | Kohiyama et al. .......... 713/193 |
| 2005/0055552 A1* | 3/2005 | Shigeeda .................... 713/171 |
| 2006/0107311 A1* | 5/2006 | Dawson et al. ................. 726/5 |
| 2008/0005563 A1* | 1/2008 | Rubin ........................ 713/168 |

* cited by examiner

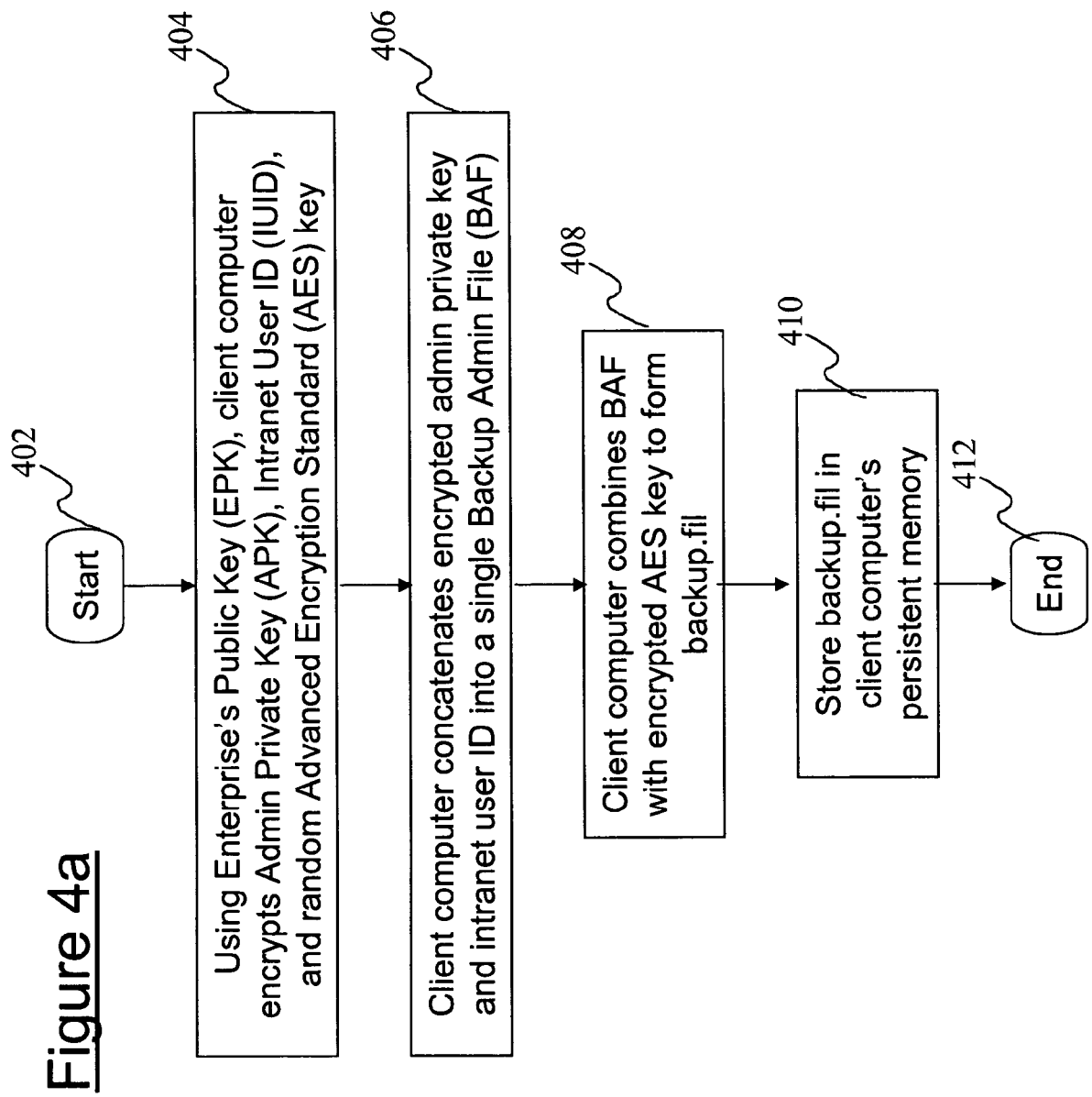

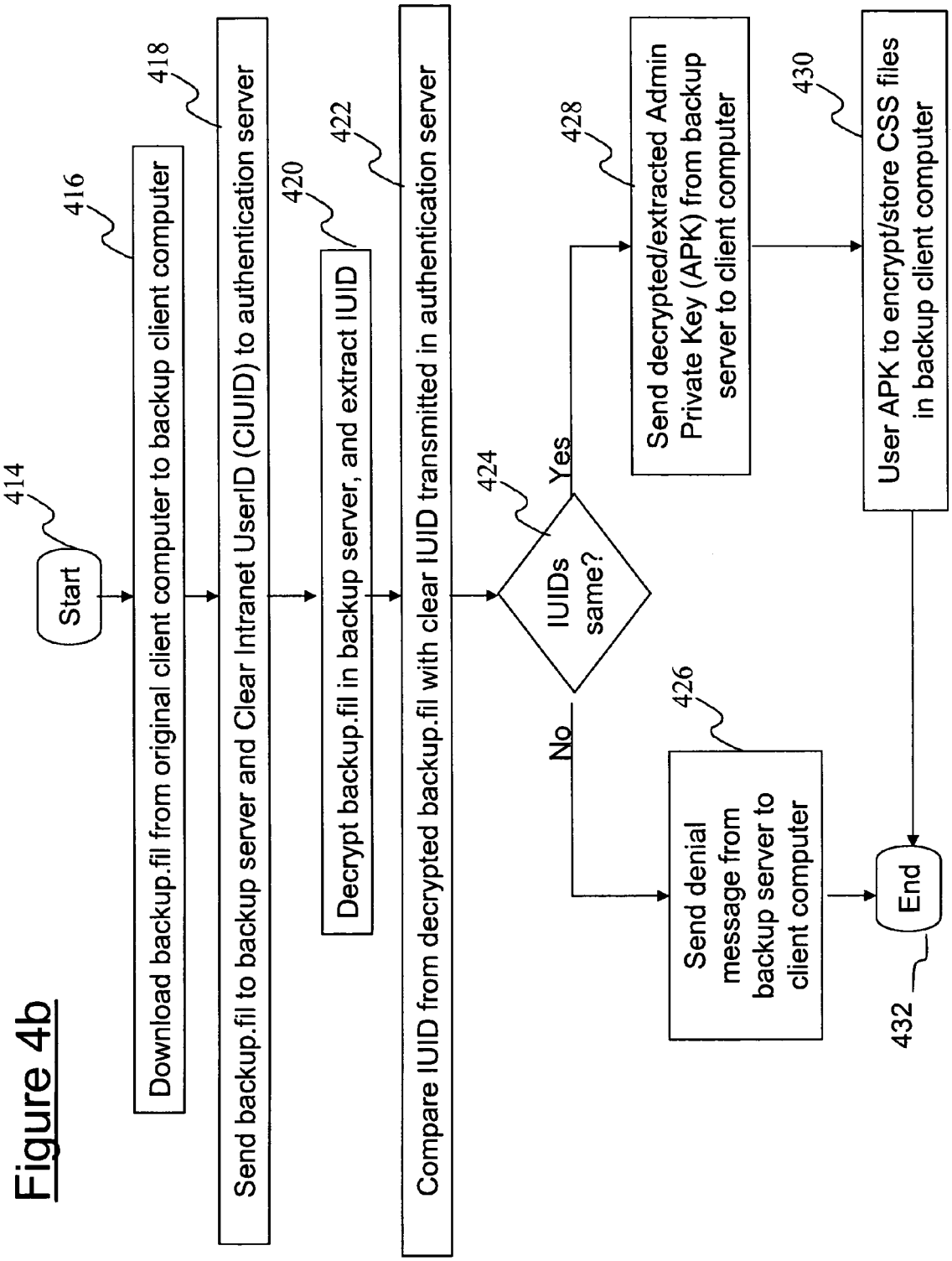

BACKUP RESTORE IN A CORPORATE INFRASTRUCTURE

BACKGROUND OF THE INVENTION

1. Technical Field

The present invention relates in general to the field of computers, and in particular to intranet networks. Still more particularly, the present invention relates to a method and system for allowing a user on a backup client device on an enterprise's intranet to access a backup admin key from a backup server on the intranet.

2. Description of the Related Art

Early modern computers were stand-alone. As such, maintaining security for data on the computer was simple, since all that was necessary was to take steps to ensure that only authorized persons were allowed physical access to the computer. However, computers soon began "talking" to each other over networks, including Local Area Networks (LANs) and Wide Area Networks (WANs), including the Internet. A LAN that uses the Internet's Transmission Control Protocol/Internet Protocol (TCP/IP) standard has come to be called an "intranet."

Since only authorized users should be given access to an intranet and its resources, many enterprises use a Client Security Software (CSS) system, such as depicted in FIG. 1 as CSS system 100. CSS system 100 includes a Trusted Protected Module (TPM) chipset 102, which sits inside a client computer (not shown) that is attached to an intranet (not shown). TPM chipset 102 has stored on it, and accessible only within TPM chipset 102, a Storage Root Key (SRK) 104. (Note that unless noted otherwise, the term "key" is understood to mean a private key in a public/private encryption key pair.)

SRK 104 is used to encrypt an admin key 106, which can be stored encrypted in any volatile or non-volatile memory in the client computer. Admin key 106, when decrypted, can be used to encrypt/decrypt other keys used by a user, including a user logon key 108, a user storage key 110, and a user signature key 112 key, which are (respectively) keys required for a user to wirelessly log on to an intranet, to store data in a mass storage resource connected with the intranet, and to digitally sign transmissions on the intranet.

As noted above, the TPM chipset 102 is physically within the client computer. If the TPM chipset 102 should become unavailable to the user of that client computer, then the user will be unable to utilize the intranet, since there will be no way for the user to decrypt and use the admin key 106. For example, consider the scenario in which a user has enabled the CSS system 100 on his laptop, and he wishes to log onto his company's intranet. Just as he is preparing to do so, his laptop screen cracks. While the user can offload all of his data, including his encrypted (by SRK 104) admin key 106, onto another (backup) computer, the CSS data is inaccessible without the SRK 104 that is stored in and available to only the broken laptop.

What is needed, therefore, is a method and system that allows a user to access his admin key if he is unable to access the SRK that encrypted that admin key.

SUMMARY OF THE INVENTION

The present invention is thus directed to a method and system for remotely and securely storing a user's admin key to gain access to an intranet. The user's admin key and intranet user identification (ID) are encrypted with an enterprise's public key, and together are then concatenated into a single backup admin file, which is stored in the user's primary client computer. If the user is on a backup client computer, the single backup admin file is transferred from the primary client computer to the backup client computer. If the user needs his admin key, he will initially be unable to access it from the backup client computer. The user thus sends his encrypted single backup admin file to a backup server and his unencrypted intranet user ID to an intranet authentication server, which has an interface to the backup server. The backup server decrypts the user's encrypted backup admin file using the enterprise's private key to obtain the user's admin key and the user's intranet user ID, and then sends the user's decrypted intranet user ID to the intranet authentication server. The intranet authentication server compares the intranet user ID from the backup admin file with the intranet user ID that was sent in the clear from the backup client computer. If the intranet user ID's match, then the authentication server sends the backup server authorization to send the backup client computer a copy of the decrypted admin key, which can then be used in the backup client computer.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 4a is a flow chart showing steps depicted in the data flow of FIG. 3a; and

FIG. 4b is a flow chart showing steps depicted in the data flow of FIG. 3b.

DETAILED DESCRIPTION OF THE PREFERRED EMBODIMENT

Figure 2:
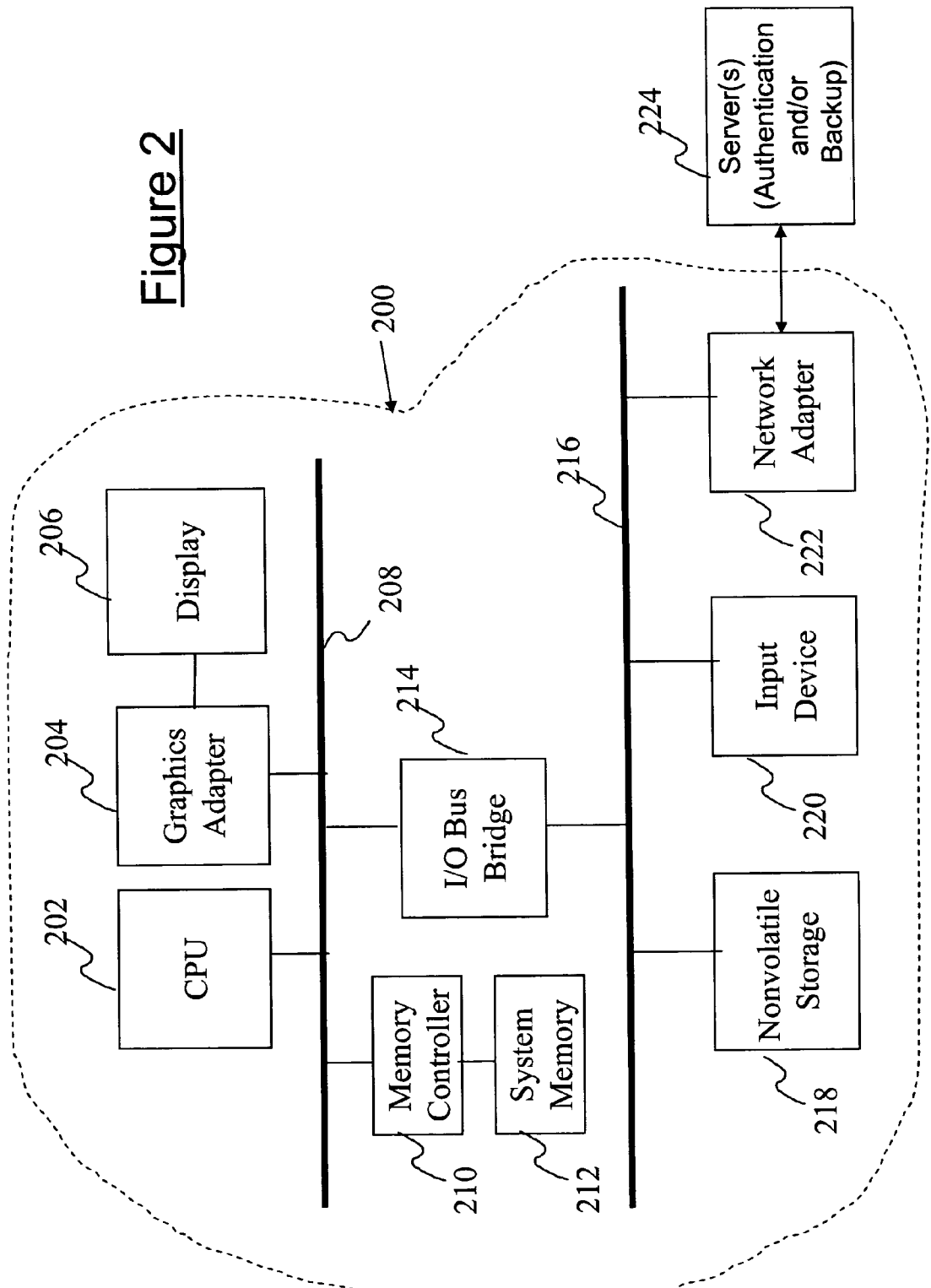
FIG. 2 depicts an exemplary computer system in which the present invention may be implemented.

With reference now to FIG. 2, there is depicted a block diagram of an exemplary data processing system in which a preferred embodiment of the present invention may be implemented. Data processing system 200 may be, for example, one of the models of personal or server computers available from International Business Machines Corporation of Armonk, N.Y. Data processing system 200 includes a central processing unit (CPU) 202, which is connected to a system bus 208. In the exemplary embodiment, data processing system 200 includes a graphics adapter 204 also connected to system bus 208, for providing user interface information to a display 206.

Also connected to system bus 208 is a memory controller 210, which controls data being read from and written to a system memory 212. System bus 208 is also connected to an input/output (I/O) bus bridge 214, which couples an I/O bus 216 to system bus 208, relaying and/or transforming data transactions from one bus to the other. Peripheral devices such as nonvolatile storage 218, which may be a hard disk drive, and input device 220, which may include a conventional mouse, a trackball, or the like, is connected to I/O bus 216. Also connected to I/O bus 216 is a network interface 222, which permits data communication with a server 224. Server 224 may be an authentication or backup server (described in further detail below), and may use the same general hardware architecture depicted for data processing system 200, which as depicted is preferably a client computer of server 224.

The exemplary embodiment shown in FIG. 2 is provided solely for the purposes of explaining the invention and those skilled in the art will recognize that numerous variations are possible, both in form and function. For instance, data processing system 200 might also include a compact disk read-only memory (CD-ROM) or digital versatile disk (DVD) drive, a sound card and audio speakers, and numerous other optional components. All such variations are believed to be within the spirit and scope of the present invention.

Figure 1:
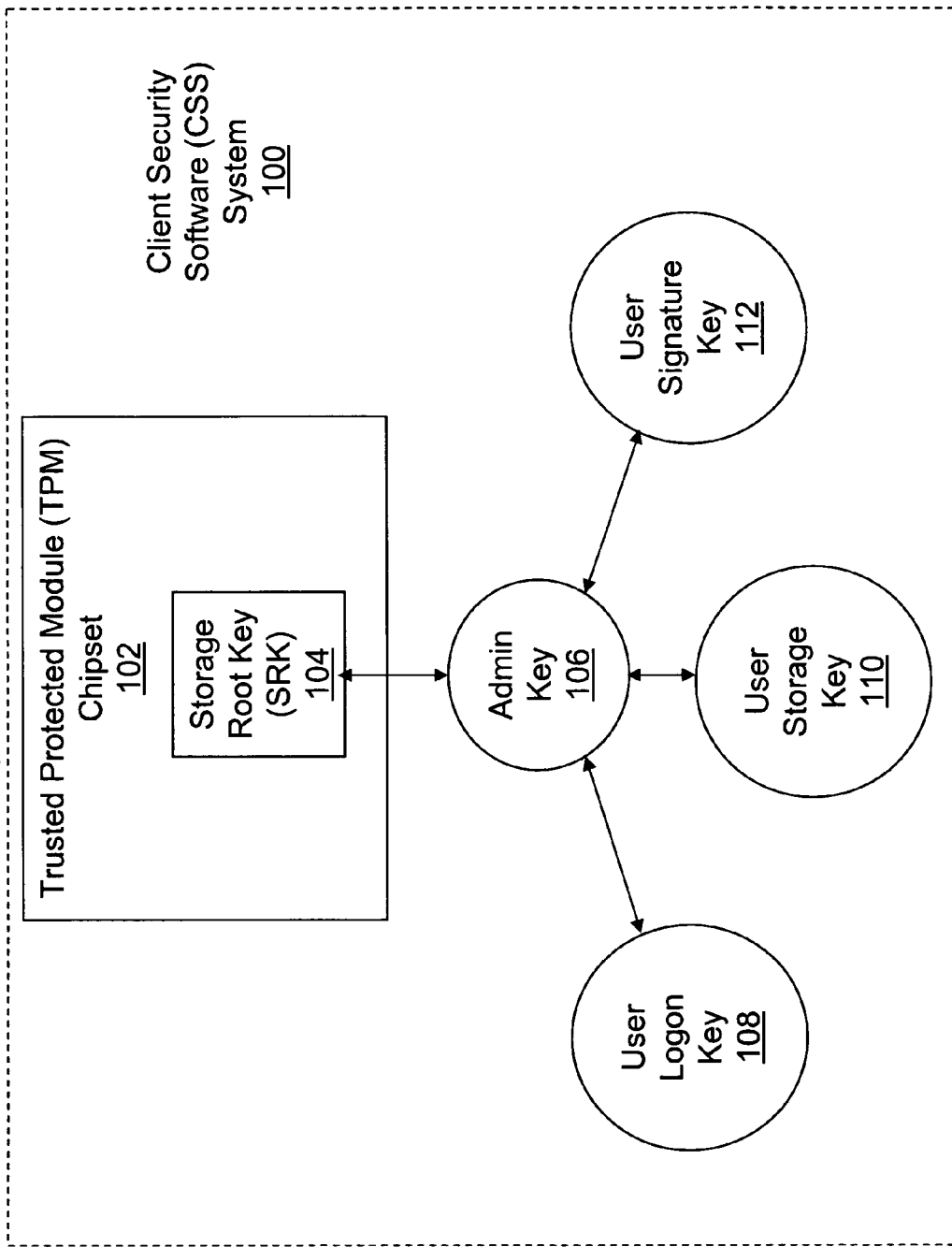
FIG. 1 illustrates a prior art Client Security Software (CSS) system using an admin key.
Figure 3A:
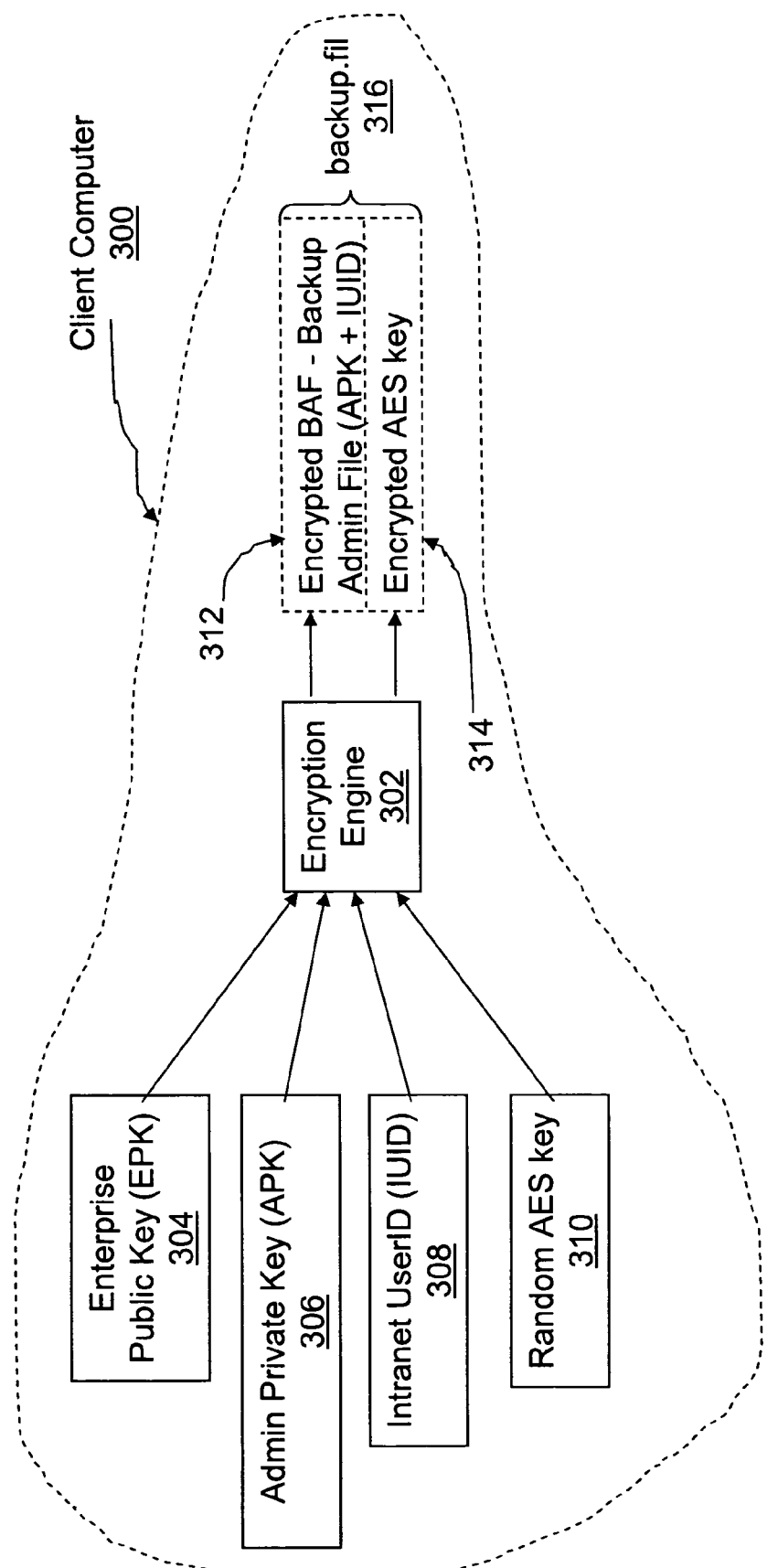
FIG. 3a illustrates a data flow in a client computer having a means for encrypting a Backup Admin File (BAF)

With reference now to FIG. 3a, a client computer 300, preferably using the hardware architecture depicted in FIG. 2, is illustrated. Within client computer 300 is an encryption engine 302, which is preferably a software application running within client computer 300. An Enterprise Public Key (EPK) 304 is a public encryption key that is preferably available to any user of an enterprise-wide intranet. An Admin (Administrative) Private Key (APK) 306 is a private key, of an encryption private/public key pair, such as Admin Key 106 described in FIG. 1. An Intranet UserID (IUID) is similar to the user logon key 110, described in FIG. 1, and is preferably unique to a particular person, project or other unique identifier. A Random AES key 310 is a private key from a randomly generated key pair that conforms to the specifications of Federal Information Processing Standards Publication 197, which is herein incorporated by reference in its entirety, and is used with EPK 304 as a second layer of encryption for encrypting/decrypting data.

Encryption engine 302, using EPK 304 (which uses random AES key 310), encrypts and concatenates APK 306 and IUID 308 into a single encrypted Backup Admin File (BAF) 312. Encryption engine 302, preferably still using EPK 304, also encrypts the random AES key 310 to create an encrypted AES key 314. The encrypted BAF 312 and the encrypted AES key 314 are combined into a single backup.fil 316, which is stored in (preferably a non-volatile) memory within client computer 300. Alternatively, backup.fil 316 contains only encrypted BAF 312, and AES key 314 remains unencrypted but still known and available for future use in decrypting backup.fil 316.

Figure 3B:
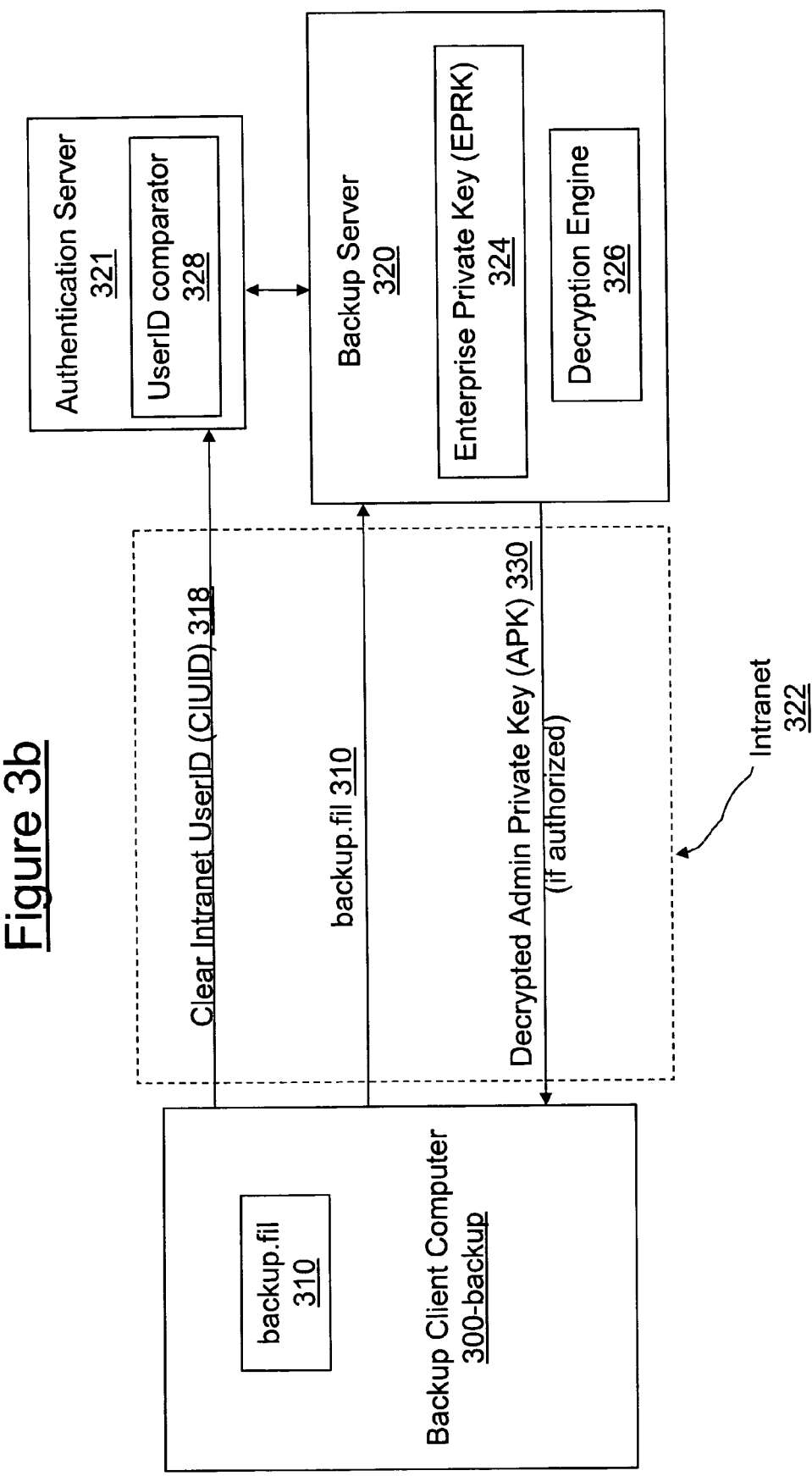
FIG. 3b depicts a data flow between the client computer and a backup server to retrieve an Admin Private Key (APK) for a user of the client computer.

With reference now to FIG. 3b, assume that the client computer 300 shown in FIG. 3a is no longer usable. For example, consider the scenario in which client computer 300 is a laptop computer whose display has cracked. The user of client computer 300 can still download the files off client computer to a backup client computer 300-backup. However, assume in the same scenario that a CSS system 100, as described in FIG. 1, was active in the original client computer 300. If so, then the Storage Root Key (SRK) 104, which can never leave the TPM chipset 102, is not available to backup client computer 300-backup. Since SRK 104 is necessary to decrypt the admin key 106, and since SRK 104 is unavailable, then backup client computer 300-backup will be unable to read any files that are protected by admin key 106. The present invention solves this problem in the following manner.

Referring again to FIG. 3b, client computer 300-backup, which has downloaded backup.fil 310 from the original client computer 300, sends backup.fil 310 to a backup server 320 and a Clear (unencrypted) Intranet UserID (CIUID) 318 to an authentication server 321 via an intranet 322. Intranet 322 is preferably a secure enterprise-wide intranet. Similarly, Backup server 320 contains an Enterprise PRivate Key (EPRK) 324, which is the private key that corresponds with the Enterprise Public Key (EPK) 304 shown in FIG. 3a. Backup server 320 also has a decryption engine 326, which is preferably a software application or an Application Specific Integrated Circuit (ASIC) capable of using EPRK 324 to decrypt data.

Authentication server 321 contains a UserID comparator 328, which allows authentication server 321 to compare the CIUID 318 with the IUID 308 received from backup server 320 after backup server 320 decrypts backup.fil 310. If the two Intranet User IDs (IUIDs) match, then authentication server 321 will send backup server 320 authorization signal allowing backup server 320 to send the backup client computer 300-backup a decrypted Admin Private Key (APK) 330, which is the same as APK 306.

With reference now to FIG. 4a, which corresponds with the software flow shown in FIG. 3a for creating a backup admin file, the process starts at initiator block 402. As shown in block 404, the client computer, using the Enterprise's Public Key (EPK), encrypts an Admin Private Key (APK), an Intranet User ID (IUID) and a randomly generated AES key. The encrypted APK and IUID are concatenated into a single Backup Admin File (BAF), as described in block 406. The BAF and encrypted AES key are then combined by the client computer to create a file named "backup.fil" (block 408), which is then stored in the client computer's (preferably) nonvolatile memory (block 410), thus ending the steps for creating and storing "backup.fil" (terminator block 412).

Referring now to FIG. 4b, which corresponds with the software flow shown in FIG. 3b for retrieving the backup admin file, the process starts at initiator block 414. As shown in block 416, the new (backup) client computer downloads the "backup.fil" file from the original client computer. The backup client computer then transmits, over the enterprise's intranet, the "backup.fil" file to a backup server and a Clear Intranet UserID (CIUID) for the user of the client computer to an authentication server (block 418). Note that if the enterprise intranet is secure, then the CIUID may be transmitted unencrypted. Alternatively, the CIUID may be encrypted before transmission using an encryption scheme known to both the backup client computer as well as the backup server (such as a Secure Sockets Layer (SSL) scheme).

As described in block 420, the backup server then decrypts the "backup.fil" file, preferably using the enterprise's private key that matches the enterprise public key (shown in block 404 of FIG. 4a) that encrypted the "backup.fil" file, and then extracts the IUID from the "backup.fil" file. The backup server send the authentication server the decrypted IUID, and the authentication server then compares the IUID extracted from the "backup.fil" file with the CIUID that was transmitted from the backup client computer along with the "backup.fil" file (block 422). If the two IUIDs match (see query block 424), then the authentication server sends the backup server an authorization signal indicating that the backup server can trust the sender (user) of the "backup.fil" and CIUID. The backup server then sends the backup client computer a clear copy (unencrypted) of that user's Admin Private Key (APK), which the backup server extracted from the "backup.fil" file after decryption. The backup client computer can then use the APK to encrypt/decrypt/store in the backup client computer the CSS files as described in FIG. 1, making them accessible to only the user of the backup client computer.

If the IUID's do not match (block 426), then a message is sent from the backup server to the backup client computer informing the user of the backup client computer that her request for a copy of her Admin Private Key (APK) has been denied, and the process ends (terminator block 432).

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention. For example, while the present invention has been described as being used with an enterprise's intranet, it may also be used with any network system in which an admin key may be inaccessible as described above. Similarly, while the backup server and the authentication server have been described as separate servers, alternatively their function may be incorporated into a single server.

What is claimed is:

1. A method comprising:
    receiving at an authentication server a user's Clear Intranet UserID (CIUID) from a backup client computer via an intranet;
    receiving at said authentication server an Intranet UserID (IUID) from a backup server, wherein said IUID is extracted from a backup file previously sent by said backup client computer to said backup server, wherein said backup file includes a backup admin file (BAF) and an encrypted AES key, and wherein said BAF includes an encrypted Admin Private Key (APK) concatenated with an encrypted IUID; and
    instructing said backup server to send an unencrypted Admin Private Key (APK) to said backup client computer when said IUID from said backup server matches said CIUID from said backup client computer, such that said backup client computer is able to use said APK to encrypt and store client security software (CSS) files in said backup client computer.

2. The method of claim 1, wherein said encrypted APK and said encrypted IUID are encrypted within a primary client computer.

3. The method of claim 2, wherein said encrypted APK and said encrypted IUID are encrypted within said primary client computer using an Enterprise Public Key (EPK).

4. The method of claim 1, wherein said backup file is downloaded from said primary client computer to said backup client computer at a user's request.

5. The method of claim 1, wherein method further includes sending a denial message to said backup client computer when said IUID from said backup server does not match said CIUID from said backup client computer.

6. An authentication server comprising:
    means for receiving at an authentication server a user's Clear Intranet UserID (CIUID) from a backup client computer via an intranet;
    means for receiving at said authentication server an Intranet UserID (IUID) from a backup server, wherein said IUID is extracted from a backup file previously sent by said backup client computer to said backup server, wherein said backup file includes a backup admin file (BAF) and an encrypted AES key, wherein said BAF includes an encrypted Admin Private Key (APK) concatenated with an encrypted IUID; and
    means for instructing said backup server to send an unencrypted Admin Private Key (APK) to said backup client computer when said IUID from said backup server matches said CIUID from said backup client computer, such that said backup client computer is able to use said APK to encrypt and store client security software (CSS) files in said backup client computer.

7. The authentication server of claim 6, wherein said encrypted APK and said encrypted IUID are encrypted within a primary client computer.

8. The authentication server of claim 7, wherein said encrypted APK and said encrypted IUID are encrypted within said primary client computer using an Enterprise Public Key (EPK).

9. The authentication server of claim 6, wherein said authentication server further includes means for sending a denial message to said backup client computer when said IUID from said backup server does not match said CIUID from said backup client computer.

* * * * *